Dec. 22, 1959   J. BONAGURO   2,917,972
REMOTE CONTROL MIRROR
Filed June 24, 1957   2 Sheets-Sheet 1
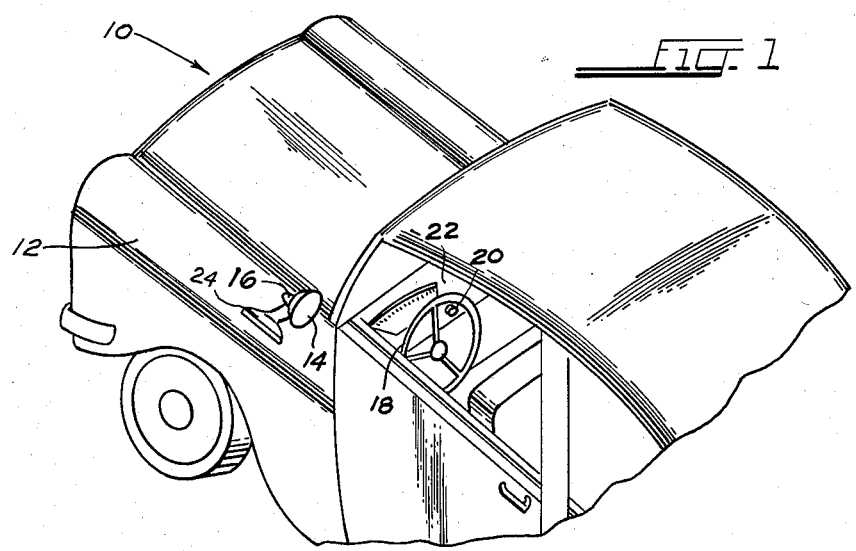
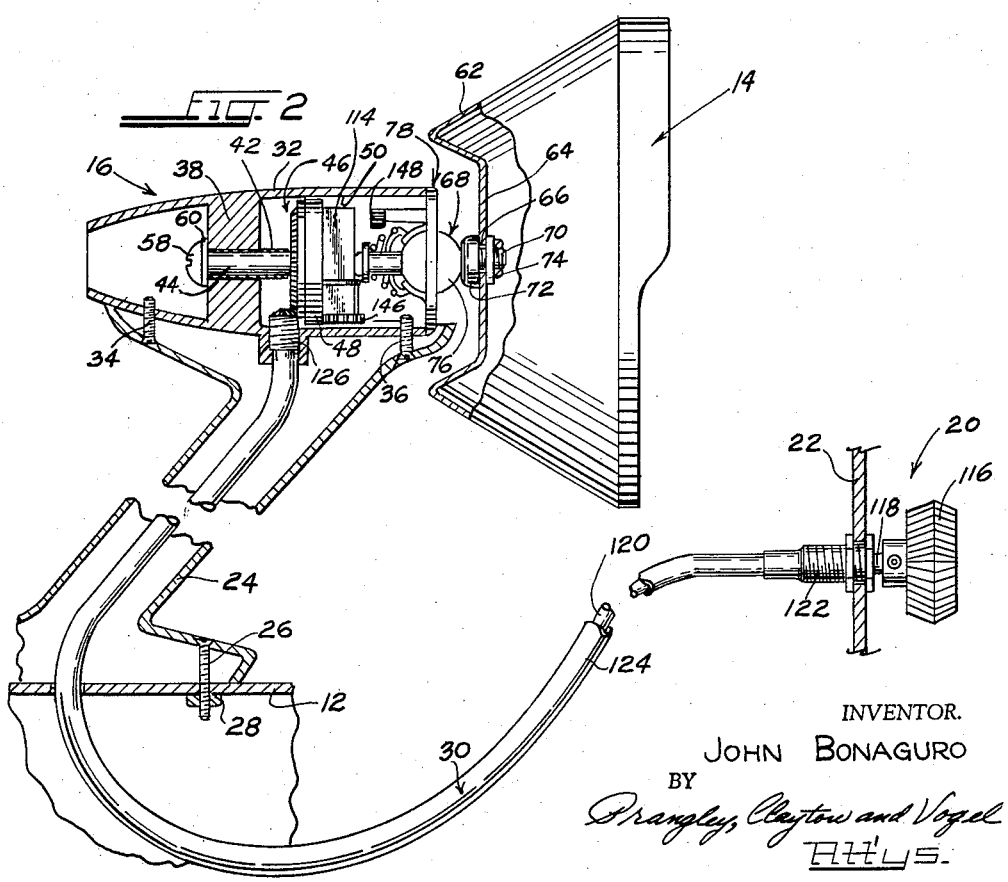
INVENTOR.
JOHN BONAGURO
BY
Prangley, Clayton and Vogel
Attys.

Dec. 22, 1959   J. BONAGURO   2,917,972
REMOTE CONTROL MIRROR
Filed June 24, 1957   2 Sheets-Sheet 2
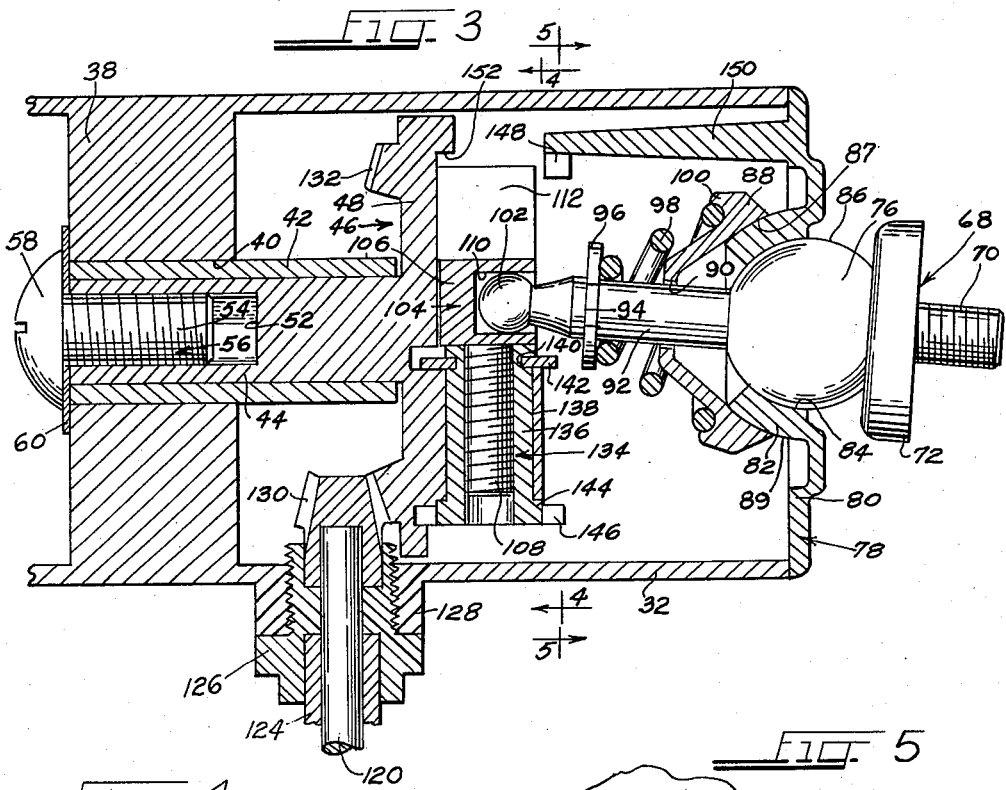
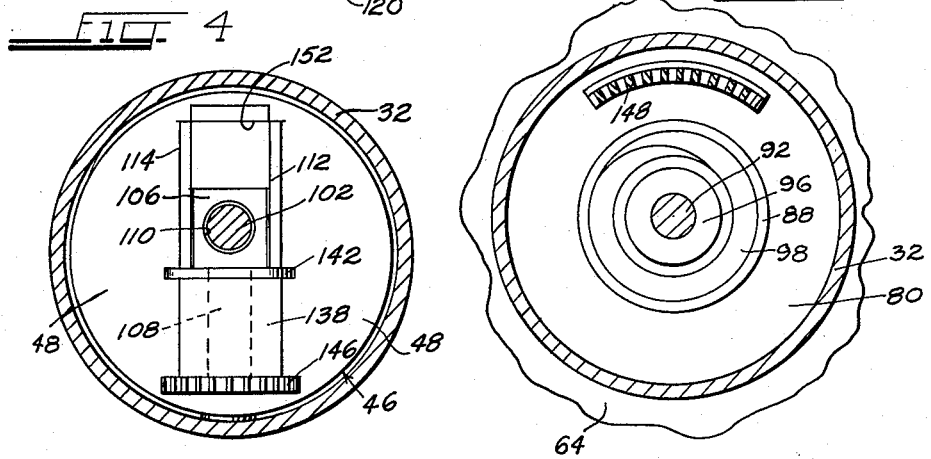
INVENTOR.
JOHN BONAGURO

United States Patent Office 2,917,972
Patented Dec. 22, 1959

2,917,972

REMOTE CONTROL MIRROR

John Bonaguro, Chicago, Ill., assignor to Unity Manufacturing Company, Chicago, Ill., a corporation of Illinois Application June 24, 1957, Serial No. 667,490

8 Claims. (Cl. 88—93)

This invention relates to a rear vision mirror for automobiles and the like and more particularly to a mirror which can be mounted on the exterior of the vehicle and can be controlled as to position from within the vehicle.

It is customary to provide rear vision mirrors on vehicles such as automobiles, trucks, buses and the like. In certain prior installations of such mirrors it has been the custom to place the mirror within the vehicle as for example in the operating cab where the position of the mirror can be adjusted manually by the operator while in his operating seat. In more recent times it has been found desirable to mount the rear vision mirrors on the exterior of the vehicle and a presently preferred installation in many instances is on the adjacent fender of the vehicle. Mirrors mounted exteriorally of the operating cab, as for example, on the fender can be adjusted only by the operator leaving his operating seat and getting out of the vehicle to gain access to the mirror. Adjustment must be by trial and error and, accordingly, such adjustment is tedious and time consuming and is a great deal of trouble when various persons use the same vehicle one after the other. In an effort to facilitate positioning of the mirror the assistance of another person can be obtained but is not always available.

Accordingly, it is an important object of the present invention to provide an improved rear vision mirror mounting mechanism.

Another object of the invention is to provide a rear vision mirror mounting wherein the position of the mirror can be adjusted from a remote point.

Yet another object of the invention is to provide a rear vision mirror on the exterior portions of a vehicle, the position of the mirror being controlled from within the vehicle.

Still another object of the invention is to provide in a rear vision mirror installation of the type set forth a mirror and more specifically a single control member.

In connection with the foregoing object it is another object of the invention to provide a rear vision mirror installation in which a single type of motion of the control member is operative to change the position of the rear vision mirror through a plurality of predetermined positions in a predetermined relationship whereby to permit the operator to choose the correct and most convenient viewing position from among a large number of possible viewing positions.

A further object of the invention is to provide an improved control mechanism for positioning mirrors and the like in which all possible combinations of positions of a member such as the mirror's surface can be obtained with respect to the three standard axes of orientation.

A still further object of the invention is to provide a control system of the type set forth in which positioning can be obtained by a simple rotary movement of a single type of one control member.

These and other objects and advantages of the present invention will be better understood from the following description when taken in conjunction with the accompanying drawings. In the drawings wherein like reference numerals have been utilized to designate like parts throughout:

Figure 1 is a partial perspective view of an automobile illustrating a rear vision mirror installed on the fender and equipped with a positioning mechanism of the present invention whereby the position of the mirror can be adjusted from within the vehicle by means of a single control member operable by imparting a single type of motion thereto;

Figure 2 is an enlarged view with certain portions broken away and certain portions in vertical section illustrating the interconnection between the control member, the positioning mechanism and the mirror of the present invention;

Figure 3 is a further enlarged view in vertical section through the control and positioning mechanism of Figure 2;

Figure 4 is a view on a reduced scale in vertical section through the control and positioning mechanism substantially as seen in the direction of the arrows along the line 4—4 of Figure 3; and Figure 5 is a view on a reduced scale in vertical section through the control and positioning mechanism of Figure 3 substantially as seen in the direction of the arrows along the line 5—5 thereof.

The remote control and positioning mechanism of the present invention has general utility but certain of the features and advantages thereof are most fully realized when used in conjunction with a rear vision mirror. Such rear vision mirrors are common on vehicles such as automobiles, trucks, buses and the like and, accordingly, the invention has been shown specifically applied in conjunction with a rear vision mirror mounted upon an automobile generally designated by the numeral 10. Automobile 10 is provided with the usual fender 12 on which is mounted a rear vision mirror 14 by means of a remote positioning and control mechanism 16 made in accordance with and embodying the principles of the present invention. Mirror 14 has more specifically been shown mounted upon the left hand fender of automobile 10 so that it can readily be seen and utilized by the driver of automobile 10 while in his operating position and while engaging the steering wheel 18. The remote control member, generally designated by the numeral 20, has been illustrated as being mounted on the automobile dash board 22 although it is to be understood that control member 20 can be mounted at any point convenient for the operator.

Referring now to Figure 2 of the drawings it will be seen that the remote control and mounting mechanism 16 includes a suitable pedestal 24 secured to fender 12 by means of bolts 26 and nuts 28. Preferably pedestal 24 is hollow whereby to receive a control cable 30 extending between positioning mechanism 16 and the control member 20.

Mounted on pedestal 24 is a main housing 32 having a cylindrical portion at the rearwardly directed or right hand end as viewed in Figure 2 and tapering toward the left hand or forwardly directed end thereof. A pair of screws 34 and 36 suitably secures housing 32 upon pedestal 24. Formed intermediate the ends of housing 32 and extending radially inwardly from the outer walls thereof is a transverse support wall 38 having an aperture 40 therein. Received in aperture 40 is a bearing sleeve 42 which receives therein the shank 44 of a gear member generally designated by the numeral 46. Gear member 46 has a radially and outwardly extending plate or wall 48 which extends beyond the periphery of sleeve 42 and outwardly to the inner cylindrical wall 50 of housing 32. Shank 44 has an aperture 52 formed therein (see Figure 3) which is internally threaded to receive the threaded shank 54 of a screw 56, screw 56 having an enlarged head 58. A washer 60 is provided between head 58 and the adjacent ends of sleeve 42, shank 44 and support wall 38. The above construction serves rotatably to support gear member 46 in a predetermined position within housing 32.

Means is provided to mount the mirror 14 upon the positioning and control mechanism 16. From Figure 2 it will be seen that mirror 14 is provided with a hollow housing 62 which serves to support the mirror, housing 62 having a support wall 64 disposed substantially parallel to the reflecting surface of mirror 14. Wall 64 has disposed in the center thereof an aperture 66, the center of aperture 66 and the center of mirror 14 being substantially in alignment along a line perpendicular to the reflecting surface of mirror 14.

A mounting member generally designated by the numeral 68 serves to mount mirror housing 62 upon the positioning and control mechanism 16. Mounting member 68 includes a shaft 70 extending therefrom and externally threaded and shaped to pass through aperture 66 in support wall 64. A shoulder 72 is provided to abut against wall 64 and a nut 74 threadedly engages shaft 70 whereby to clamp wall 64 between shoulder 72 and nut 74. This serves fixedly to interconnect mirror housing 62 and the mounting member 68.

Formed adjacent shoulder 72 is a part-spherical ball portion 76 which is adapted to form a universal joint with a cover member generally designated by the numeral 78. Cover member 78 includes an annular portion 80 shaped externally to conform to the external configuration of the adjacent end of housing 32 whereby in conjunction with mounting ball 76 to close the adjacent end of housing 32. Extending rearwardly from portion 80 is a flange 82 which has an inner part-spherical surface 84 adapted to receive and closely to fit with the part-spherical surface 86 on ball portion 76. It will be understood that mounting ball 76 in cooperation with flange 82 provides a universal mounting which mounts mirror 14 upon the housing 32.

Means is provided firmly to fit mounting ball 76 upon the cooperating part-spherical flange 82. To this end a washer 88 is provided, washer 88 being dish shaped whereby to provide a part-spherical surface 87 to receive and cooperate with the outer part-spherical surface 89 of flange 82. An aperture 90 is provided in washer 88 to receive therethrough a shaft 92 formed integral with the mounting ball 76 and having the axis thereof in alignment with the axis of shaft 70. Accordingly, the axis of shaft 92 is disposed perpendicular to the plane of the reflecting surface of mirror 14. A groove 94 is provided in shaft 92 to receive a snap ring 96. A spring 98 under compression is provided between snap ring 96 and a shoulder 100 on washer 88 whereby spring 98 urges washer 88 against cover member 78 and also urges mounting ball 76 against surface 84 of flange 82.

Means is provided in cooperation with gear member 46 described above to move the position of the axis of mounting member 68 and therefore to move the position of the plane of the reflecting surface of mirror 14. To this end shaft 92 is provided with a ball 102. Ball 102 is received in and moved by a follower, generally designated by the numeral 104 mounted upon gear 46. Follower 104 includes a substantially cubically shaped engagement portion 106 from one side of which extends a threaded shaft 108. Formed in engagement portion 106 is a cylindrical bore 110 having a radius slightly greater than the radius of ball 102 whereby to receive ball 102 therein. The axis of bore 110 is perpendicular to the axis of threaded shank 108 whereby shank 108 is directed radially outwardly with respect to the axis of gear member 46.

Follower 104 slides along the surface of gear wall 48 disposed toward mounting member 68 and is confined to travel across the face thereof in a direction perpendicular to the longitudinal axis of shank 44 and bore 110 and preferably across the diameter of the main wall 48. Follower 104 is confined to travel in such a path by a pair of walls 112 and 114 formed integral with wall 48.

It will be apparent from the drawings that when the center of ball 102 is disposed away from the axis of gear shank 44, rotation of gear member 46 will cause the center of ball 102 to move in a circular path. As a result of moving ball 102 in a circular path, the axis of mounting member 68 will pivot about a point passing through the geometrical center of the mounting ball 76. More specifically the axis of shaft 92 will generate a cone in space when gear member 46 is rotated, the apex of the cone lying at the center of mounting ball 76 and the walls of the cone being defined by a line passing through the center of mounting ball 76 and through the center of ball 102. The axis of mounting shaft 70 will similarly generate a cone in space whereby to move the mirror housing 62 and the associated mirror in a similar path. The reflecting surface of mirror 14 will wobble about an axis passing through the center of mounting ball 76 and along the axis of rotation of gear member 46. As a result of the wobble motion of mirror 14, the reflecting surface thereof will be positioned in a plurality of positions during the rotation of gear member 46 through a complete revolution.

Means is provided to rotate gear member 46 by use of the remote control member 20. Referring to Figure 2 of the drawings it will be seen that control member 20 includes a knob 116 which is fixedly attached to one end 118 of the inner flexible control member 120 in control cable 30. A suitable fitting 122 serves to mount cable 30 upon the dash board 22. The inner flexible control member 120 extends from knob 116 through the protective outer sheath 124. More specifically the control cable 30 extends from fitting 122 outwardly from the control or operating panel of automobile 10 under fender 12 and up through the hollow pedestal 26. The outer sheath 124 carries a second fitting 126 which has external threads thereon whereby it can be connected to an internally threaded circular extension 128 formed on the lower edge of housing 32.

The inner flexible control member 120 carries on the outer end thereof a gear 130 having bevel gear teeth formed thereon adapted to cooperate with a ring gear 132 formed on gear wall 48. Rotation of control knob 116 therefore serves to rotate gear member 46 about the axis of rotation thereof. In one preferred embodiment of the invention the relationship between gears 130 and 132 is such that four rotations of knob 116 will cause a full rotation of gear member 46.

From the above construction it will be seen that rotation of knob 116 will serve to wobble mirror 14 and the reflecting surface thereof through a plurality of positions, one of which positions the operator in automobile 10 may wish to select as the correct reflecting position for his use.

The number of possible positions obtained by moving control knob 116 can be substantially increased by changing the distance between the center of ball 102 and the axis of rotation of gear member 46. This is accomplished by moving follower 104 radially outwardly and inwardly along wall 48. To this end the threaded shank 108 of follower 104 is received within a follower gear generally designated by the numeral 134. Gear 134 has a cylindrical portion 136 which is provided with a threaded aperture therein which in turn receives the threaded shank 108 of follower 104. The cylindrical portion 136 of follower gear 134 is in turn received within a housing 138 formed on gear member 46. The internal surface of housing 138 is cylindrical whereby to receive the cylindrical portion 136 of follower gear 134. In order to hold follower gear 134 in proper position within housing 138 a slot 140 is provided adjacent one end of follower gear 134 to receive a snap ring 142. Snap ring 142 bears against one end of housing 138. The other end of follower gear 134 has an outwardly extending flange 144 formed thereon which bears against the other end of housing 138. Flange 144 in cooperation with snap ring 142 serves fixedly to position follower gear 134 as regards axial movement thereof while permitting free rotation about the axis of rotation thereof.

Means is provided to rotate follower gear 134. A first set of gear teeth 146 is provided extending outwardly from flange 144. Gear teeth 146 are adapted to engage with teeth 148 provided on an extension 150 formed integral with cover member 78.

When gear member 46 is rotated, the teeth 146 on follower gear 134 are brought into engagement with the teeth 148 on extension 150. The arcuate extent of gear teeth 148 is substantially less than 360° and, accordingly, gear teeth 146 and 148 are in engagement for only a fraction of the total revolution of gear member 46. While teeth 146 and 148 are in engagement, follower gear 134 is rotated but its position with respect to the face of gear member 46 is fixed. Accordingly, follower 104 then is free to move across the face of gear member 48, is moved because of the interaction of the threads between follower gear 134 and follower shank 108. By this mechanism the ball engaging portion 106 of follower 104 can be moved from a position adjacent the end of follower gear 134 as viewed in Figure 3 to a position adjacent a shoulder 152 formed near the periphery of wall 148 opposite follower gear 134. When engagement portion 106 bears against shoulder 152 the mechanism is locked against further motion and more specifically control knob 116 cannot be further moved in a direction tending to move follower 104 radially outwardly with respect to gear member 46. It will be seen from Figure 3 that the center of ball 102 is disposed radially outwardly away from the axis of rotation of gear member 46 and can be moved only radially further outwardly.

The manner in which mirror 14 can be positioned so that it reflects properly for rear vision by the driver will now be explained. Assuming that the parts are in the position illustrated in Figure 3 of the drawing, the operator begins to turn knob 116. This causes rotation of the gear 130 which in turn drives gear member 46 about its axis of rotation. Since the center of ball 102 is disposed radially outwardly or eccentrically with respect to the axis of rotation of gear member 46, it will be driven in a path which is circular in a plane perpendicular to the axis of rotation of gear member 46. This movement of ball 102 will serve to wobble the mounting member 68 about the center of mounting ball 76. This will in turn cause mirror 14 to wobble and assume a series of different positions with respect to the viewer or operator within car 10. After approximately two revolutions of control knob 116 teeth 146 on follower gear 134 will engage teeth 148. In a preferred form of the invention there is sufficient engagement between teeth 146 and 148 to move follower 104 radially outwardly a distance across the face of gear member 46 so that the axis of mounting shaft 92 is moved on degree outwardly with respect to the axis of rotation of gear member 46. For the major portion of the text revolution of gear member 46, mirror 14 will be wobbled through a slightly longer closed path. The teeth 146 again engage teeth 148 whereby to move follower 104 radially outwardly another distance whereby to increase the angularity between the axis of shaft 92 and the axis of rotation of gear member 46 by another degree. During the next revolution of gear member 46 mirror 14 will be wobbled through still a larger path. This process can be continued until follower 104 engages shoulder 152.

It will be seen therefore that mirror 14 is driven through a closed path. The shape of the path is periodically changed whereby to present mirror 14 at a different position with respect to an operator within car 10.

Eventually the mirror will assume a position which is correct for rear view vision by the operator at which time turning of control knob 116 is stopped. The amount of wobble of mirror 14 is continuously and automatically changed and it is apparent that the rotation of knob 116 can be reversed whereby either to increase or to decrease the angle of wobble provided follower 104 is positioned intermediate follower gear 134 and shoulder 152.

From the above it will be seen that there has been provided a rear view mirror system including a positioning and control mechanism therefor which facilitates accurate positioning of mirror 14 with respect to the operator. Positioning of mirror 14 is accomplished while sitting in the driver's seat and eliminates the necessity for leaving the driver's seat. This is particularly important when drivers are changed frequently and when the weather is inclement or when speed of adjustment is desirable. Adjustment is accomplished by turning the single control knob 116. The various positions of mirror 14 are achieved by a single type of motion of knob 116, namely rotation about the axis thereof. This substantially simplifies accurate positioning of mirror 14.

Although one preferred form of the invention has been shown and described for purposes of illustration, it is to be understood that various changes and modifications can be made therein without departing from the spirit and scope of the invention. Accordingly, the invention is to be limited only as set forth in the following claims.

I claim:

1. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housing to support a mirror, and means to rotate said plate about the axis thereof with said follower disposed radially outwardly from the axis of rotation whereby to wobble said another end and an associated mirror through a closed path.

2. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housing to support a mirror, means to rotate said plate about the axis thereof with said follower disposed radially outwardly from the axis of rotation whereby to wobble said another end and an associated mirror through a closed path, and means periodically to move the follower toward and away from the axis of rotation of said plate during rotation thereof.

3. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housing to support a mirror, a gear ring mounted on said plate, and a gear mounted on said housing and engaging said gear ring to rotate said plate about the axis of rotation thereof whereby to move the follower in a closed path and to wobble said another end of the mounting member and a mirror mounted thereon through a closed path.

4. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housing to support a mirror, a gear ring mounted on said plate, a gear mounted in said housing and engaging said gear ring to rotate said plate, and gear mechanism connected to said follower to move the follower toward and away from the axis of rotation of said plate during rotation of said plate.

5. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housing to support a mirror, a gear ring mounted on said plate, a gear mounted in said housing and engaging said gear ring to rotate said plate, a follower gear mounted on said plate for rotation about an axis disposed perpendicular to the axis of rotation of said plate, a threaded connection between said follower gear and said follower, and a second gear mounted within said housing and engaging said follower gear to move the follower toward and away from the axis of rotation of said plate upon rotation of said plate.

6. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housing to support a mirror, a gear ring mounted on said plate, a gear mounted in said housing and engaging said gear ring to rotate said plate, a follower gear mounted on said plate for rotation about an axis disposed perpendicular to the axis of rotation of said plate, a threaded connection between said follower gear and said follower, and a gear segment mounted in said housing adjacent the path of travel of said follower gear to engage said follower gear during a portion of the rotation of said plate whereby automatically to move said follower toward and away from the axis of rotation of said plate upon rotation of said plate.

7. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housing to support a mirror, a gear ring mounted on said plate, a gear mounted in said housing and engaging said gear ring to rotate said plate, a follower gear mounted on said plate for rotation about an axis disposed perpendicular to the axis of rotation of said plate, a threaded connection between said follower gear and said follower, a second gear mounted within said housing and engaging said follower gear to move the follower toward and away from the axis of rotation of said plate upon rotation of said plate, and a control knob connected to said first gear whereby rotation of said control knob rotates said plate.

8. An adjustable mount for a mirror comprising a housing, a plate mounted in said housing for rotation therein, a follower mounted on said plate and movable therealong in a direction perpendicular to the axis of rotation thereof, a mounting member mounted on said housing for pivotal motion therewith, said mounting member having one end extending into said housing and engaging said follower and having another end extending out of said housig, a mirror mounted on said another end, a gear ring mounted on said plate, a gear mounted in said housing and engaging said gear ring to rotate said plate, a follower gear mounted on said plate for rotation about an axis disposed perpendicular to the axis of rotation of said plate, a threaded connection between said follower gear and said follower, a second gear mounted within said housing and engaging said follower gear to move the follower toward and away from the axis of rotation of said plate upon rotation of said plate, and a control knob connected to said first gear whereby rotation of said control knob rotates said plate.

References Cited in the file of this patent

UNITED STATES PATENTS

| 1,641,167 | Hannig | Sept. 6, 1927 |
| 1,688,214 | Walden | Oct. 16, 1928 |
| 2,456,362 | Aves | Dec. 14, 1948 |
| 2,570,536 | Fellabaum | Oct. 9, 1951 |
| 2,573,127 | Von Bredow | Oct. 30, 1951 |
| 2,614,437 | Meggitt | Oct. 21, 1952 |
| 2,623,986 | Falge | Dec. 30, 1952 |
| 2,664,029 | Higgins | Dec. 29, 1953 |
| 2,696,192 | Langford | Dec. 7, 1954 |
| 2,734,997 | Frady | Feb. 14, 1956 |
| 2,817,005 | Cameron | Dec. 17, 1957 |

UNITED STATES PATENT OFFICE
CERTIFICATE OF CORRECTION

Patent No. 2,917,972                       December 22, 1959

John Bonaguro

It is hereby certified that error appears in the printed specification of the above numbered patent requiring correction and that the said Letters Patent should read as corrected below.

Column 1, line 50, after "a" insert -- more simple control mechanism for positioning the --; column 5, line 62, for "text" read -- next --; column 8, line 27, for "housig" read -- housing --; line 51, list of references cited, for the patent number "2,696,192" read -- 2,696,142 --.

Signed and sealed this 14th day of June 1960.

(SEAL)
Attest:

KARL H. AXLINE                                       ROBERT C. WATSON
Attesting Officer                                 Commissioner of Patents